(12) United States Patent
Takahashi et al.

(10) Patent No.: US 9,751,633 B2
(45) Date of Patent: Sep. 5, 2017

(54) AIRCRAFT SAFETY DEVICE

(71) Applicant: MITSUBISHI AIRCRAFT CORPORATION, Aichi (JP)

(72) Inventors: Yuta Takahashi, Tokyo (JP); Tsuyoshi Kitamura, Tokyo (JP); Tsutomu Kawamizu, Tokyo (JP); Shingo Kawano, Tokyo (JP); Ushio Komoda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 82 days.

(21) Appl. No.: 14/613,575

(22) Filed: Feb. 4, 2015

(65) Prior Publication Data
US 2015/0232193 A1 Aug. 20, 2015

(30) Foreign Application Priority Data

Feb. 19, 2014 (JP) .................. 2014-29317

(51) Int. Cl.
*B64D 37/32* (2006.01)
(52) U.S. Cl.
CPC .................. *B64D 37/32* (2013.01)
(58) Field of Classification Search
CPC ...................................... B64D 37/32
USPC ...................................... 244/129.2
See application file for complete search history.

(56) References Cited

U.S. PATENT DOCUMENTS

| 2,850,083 | A | * | 9/1958 | Frost | B64D 37/04 137/576 |
|---|---|---|---|---|---|
| 3,567,536 | A | * | 3/1971 | Wickersham, Jr. et al. | B32B 27/00 156/242 |
| 3,708,330 | A | * | 1/1973 | Harr | B65D 90/40 220/88.1 |
| 4,013,190 | A | * | 3/1977 | Wiggins | A62C 4/00 220/501 |
| 4,615,455 | A | * | 10/1986 | Tansill | B60K 15/03 220/721 |
| 4,676,463 | A | * | 6/1987 | Tansill | B64D 37/32 137/74 |
| 6,021,978 | A | * | 2/2000 | Goss | B64D 37/32 244/129.2 |
| 6,178,991 | B1 | * | 1/2001 | Schiwek | B60P 3/22 137/351 |
| 6,994,932 | B2 | * | 2/2006 | Kinkelaar | H01M 8/04208 429/447 |

(Continued)

FOREIGN PATENT DOCUMENTS

JP 2011-102122 A 5/2011

*Primary Examiner* — Brian M O'Hara
*Assistant Examiner* — Keith L Dixon
(74) *Attorney, Agent, or Firm* — Pearne & Gordon LLP

(57) ABSTRACT

The present invention provides an aircraft safety device which can reliably prevent explosion of a fuel tank even if an inflammable gas is ignited. A safety device for explosion-proofing a fuel tank which stores fuel of an aircraft includes: a flame propagation blocking part which blocks propagation of a flame from the outside to the inside of the fuel tank through a ventilation passage which allows ventilation between the inside and the outside of the fuel tank; and a gas supply suppressing part which, when heated by the heat of the flame, suppresses supply of an inflammable gas containing the fuel gas to the flame through the ventilation passage.

5 Claims, 7 Drawing Sheets

(56) References Cited

U.S. PATENT DOCUMENTS 8,616,498 B2 * 12/2013 Hossain ................. B32B 27/12
244/121

* cited by examiner

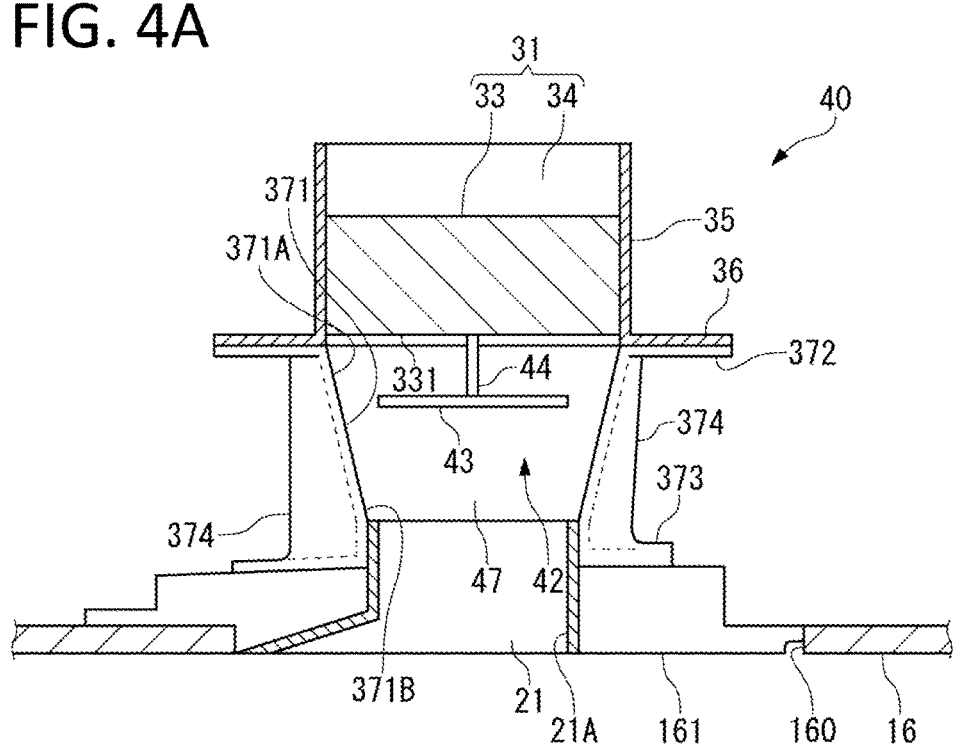
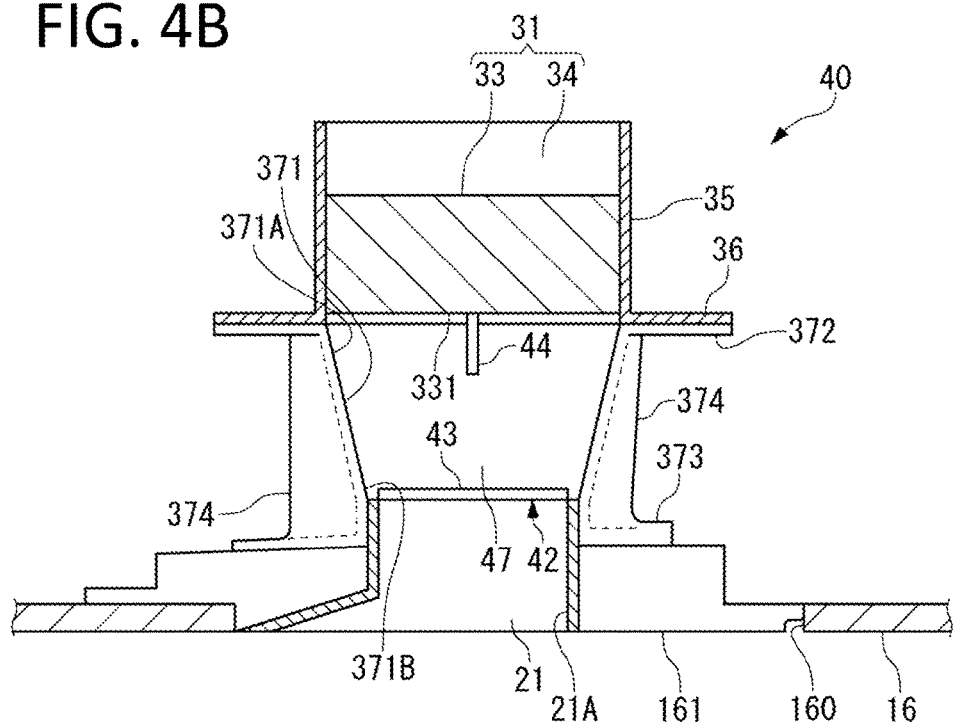

AIRCRAFT SAFETY DEVICE

BACKGROUND OF THE INVENTION

Field of the Invention

The present invention relates to an aircraft safety device used for explosion-proofing a fuel tank.

Description of the Related Art

Fuel supplied to the engine of an aircraft is stored inside a main wing which doubles as a fuel tank.

Inside the main wing, a ventilation passage which leads to the outside air is provided. Ventilation through this ventilation passage provides a balance between the outside air pressure and the pressure inside the main wing.

Here, an inflammable gas, which is a mixture of air and vapor of vaporized fuel, is present inside the ventilation passage and near a ventilation port facing the outside air. In order to prevent this gas from being ignited by a lightning strike, a semi-shield is sometimes provided which shields the ventilation port from ignition sources such as sparks while allowing entry and exit of gas.

A lightning-protection fastener equipped with an insulative cap is used for explosion-proofing a fuel tank of an aircraft (Japanese Patent Laid-Open No. 2011-102122).

Ignition of an inflammable gas can also occur due to fires in airport buildings, other aircraft fires and the like, other than lightning.

In the event of ignition, it is necessary to block the flame from penetrating into the fuel tank through the ventilation passage.

If the flame is retained at the ventilation port, it is further necessary to prevent the fuel inside the fuel tank from being heated with the flame as a heat source and igniting inside the fuel tank.

The object of the present invention is to provide an aircraft safety device which can reliably prevent explosion of a fuel tank even if an inflammable gas is ignited.

SUMMARY OF THE INVENTION

The present invention is a safety device for explosion-proofing a fuel tank which stores fuel of an aircraft, the safety device including: a flame propagation blocking part which blocks propagation of a flame from the outside to the inside of the fuel tank through a ventilation passage which allows ventilation between the inside and the outside of the fuel tank; and a gas supply suppressing part which, when heated by the heat of the flame, suppresses supply of an inflammable gas containing gas of the fuel to the flame through the ventilation passage.

According to the present invention, when an inflammable gas is ignited, a backfire, which may occur through the ventilation passage, can be blocked by the flame propagation blocking part.

Moreover, the flame can be suppressed as the gas supply suppressing part, when heated by the heat of the flame, suppresses supply of the inflammable gas to the flame. Thus, even when the flame is retained, heat propagation into the fuel tank is suppressed. Therefore, it is possible to avoid the fuel being heated to the ignition point and igniting.

In the safety device of the present invention, it is preferable that the gas supply suppressing part is positioned closer to the outside air than the flame propagation blocking part is.

Then, propagation of a flame ignited on the outside air side is blocked by the flame propagation blocking part, and the gas supply suppressing part can be activated with the heat of the flame which is left unextinguished by the flame propagation blocking part and remains on the outside air side.

The following configurations can be adopted for the gas supply suppressing part in the present invention:

(1) A configuration including a support which constitutes part of the ventilation passage, and a thermal expansion part which is provided on the inner periphery of the support and expands with the heat of a flame.

(2) A configuration including a closing member which can close the ventilation passage, and a retaining member which retains the closing member so as to keep the ventilation passage open. When heated by the heat of the flame, the retaining member releases the closing member from retention.

In the case of configuration (2), the gas supply suppressing part can be configured such that, when released from the retention of the retaining member, the closing member falls under its own weight to thereby close the ventilation passage. A retaining member which retains the closing member through magnetic force can be adopted.

The safety device of the present invention can be provided in the ventilation passage near a ventilation port which faces the outside air.

According to the present invention, it is possible to reliably prevent explosion of a fuel tank even if an inflammable gas is ignited.

BRIEF DESCRIPTION OF THE DRAWINGS

FIG. 4A is a longitudinal cross-sectional view showing a safety device according to a second embodiment in a state where a ventilation passage is open;

FIG. 4B is a longitudinal cross-sectional view showing the safety device according to the second embodiment in a state where the ventilation passage is closed;

DETAILED DESCRIPTION OF THE PREFERRED EMBODIMENTS

In the following, a safety device used for explosion-proofing a fuel tank of an aircraft will be described with reference to the accompanying drawings.

First Embodiment

Figure 1A:
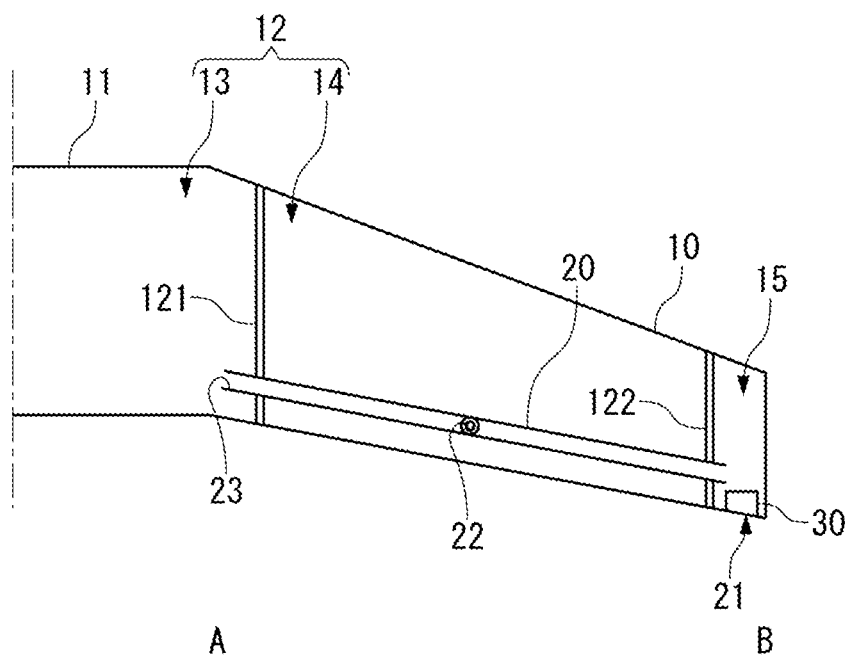
FIG. 1A is a view showing the inside (fuel tank) of a main wing of an aircraft of a first embodiment.

As shown in FIG. 1A, a fuel (jet fuel) supplied to the engine of an aircraft is stored in a fuel tank 12 which is composed of a main wing 10 and a fuselage 11.

Here, it is necessary to avoid the fuel tank 12 being subjected to an excessive pressure due to the differential pressure between the outside air pressure and the internal pressure of the fuel tank 12, even when the outside air pressure around the aircraft changes with the flight altitude. It is also necessary to continue the fuel supply by taking air into the fuel tank 12 for the amount of decrease in volume of the fuel which has left the fuel tank 12 due to consumption by the engine.

Therefore, the fuel tank 12 is provided with a ventilation passage 20, which allows ventilation between the inside and the outside of the fuel tank 12, in order to achieve a balance between the outside air pressure and the internal pressure.

(Configuration of Tank of Main Wing)

The fuel tank 12 is divided by a partition wall 121 into an inner tank 13 and an outer tank 14.

Fuel stored in the inner tank 13 and the outer tank 14 is delivered to the engine by a fuel pump (not shown). The fuel pump may be provided in each of the inner tank 13 and the outer tank 14. Alternatively, in the case where a mechanism is provided which transfers fuel between the tanks, the fuel pump may be provided in only one of the tanks.

The inner tank 13 is provided from the fuselage 11 to the base end side of the left and right main wings 10 (only one main wing is shown).

The outer tank 14 is adjacent to the inner tank 13 through the partition wall 121, and extends close to the leading end of the main wing 10. A surge tank 15 is provided at the leading end of the main wing 10.

The outer tank 14 and the surge tank 15 are provided in each of the left and right main wings 10.

The surge tank 15 is also composed of the main wing 10, and is adjacent to the outer tank 14 through the partition wall 122.

The surge tank 15 serves to receive fuel which transiently enters the ventilation passage 20 from the inner tank 13 or the outer tank 14 and prevent the fuel from leaking directly to the outside of the aircraft.

(Ventilation Passage)

The ventilation passage 20 extends in the longitudinal direction of the main wing 10 from the inner tank 13 via the outer tank 14 to the surge tank 15.

The ventilation passage 20 can be configured using a normal pipe, or can be configured using stringers which are provided in parallel with one another along the longitudinal direction of the main wing 10 on the rear surface of the skin. Specifically, the ventilation passage 20 can be formed between the stringers by separating the space between the adjacent stringers from the storage space inside the fuel tank 12.

The ventilation passage 20 includes a ventilation duct 21 which is disposed in the surge tank 15 and leads to the outside air, a ventilation port 22 which leads to the inside of the outer tank 14, and a ventilation port 23 which leads to the inside of the inner tank 13.

The ventilation passage 20 is provided in each of the left and right main wings 10 in left-right symmetry, and the ventilation ports 23 of the left and right ventilation passages 20 are disposed in the inner tanks 13.

The ventilation passage 20 communicates the internal space of each of the inner tank 13 and the outer tank 14 with the outside air. The outside air pressure and the internal pressures of the tanks are equalized, as the outside air flows into the tanks or the gas inside the tanks flows out of the aircraft according to the differential pressure between the outside air pressure and the internal pressures of the tanks.

Here, an inflammable gas, which is a mixture of air and fuel vapor (e.g., hexane) resulting from vaporization of the fuel stored in the inner tank 13 and the outer tank 14, flows inside the ventilation passage 20.

Accordingly, if a high current caused by a lightning strike on the airframe flows through the main wings 10 and is discharged at positions where fasteners are provided or the like, or if flames and sparks caused by fires in airport buildings or other aircraft fires reach the surroundings of the main wing 10, the inflammable gas present near the ventilation duct 21 may be ignited with sparks or the like as an ignition source.

Therefore, the ventilation passage 20 is equipped with a safety device 30 which explosion-proofs the fuel tank 12 against a flame F generated by ignition of the inflammable gas.

Figure 1B:
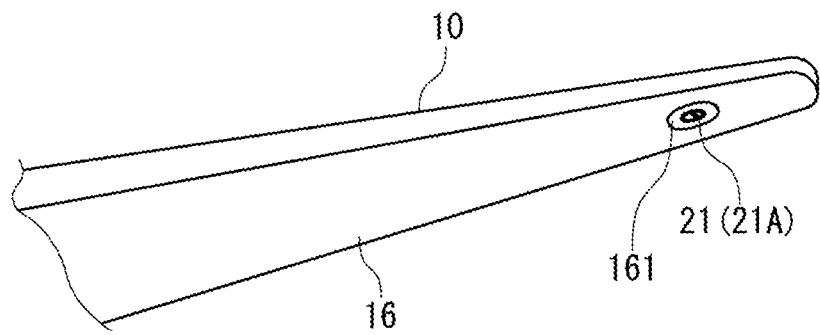
FIG. 1B is a view showing the external appearance (lower surface side) of the main wing of the first embodiment.
Figure 2:
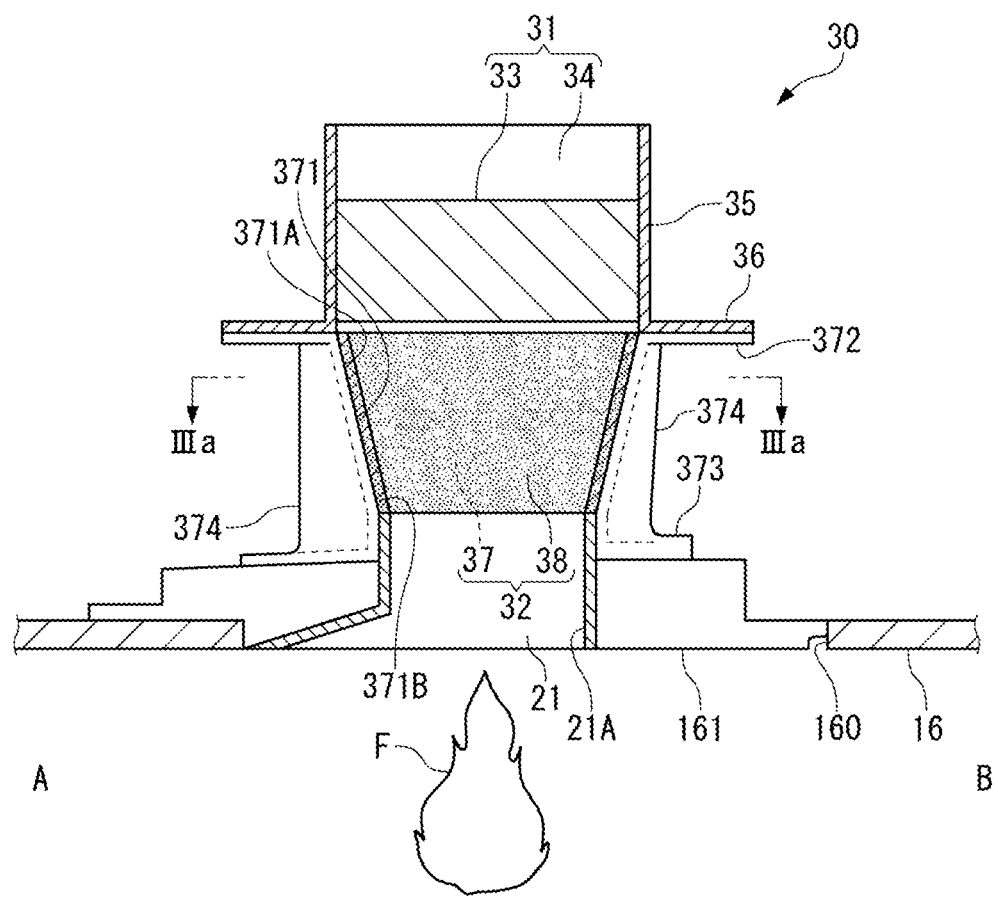
FIG. 2 is a longitudinal cross-sectional view of a safety device provided in the main wing.

As shown in FIG. 1B and FIG. 2, the ventilation duct 21 constituting part of the ventilation passage 20 is provided in a lid member 161 which closes an opening 160 provided in a lower skin 16 of the main wing 10.

The skin 16 and the lid member 161 are formed from a metal material such as aluminum alloy or stainless steel, or from fiber-reinforced resin.

The ventilation duct 21 rises up on the rear surface side of the lid member 161, and is connected to the lower end of the safety device 30.

A ventilation port 21A lying at the lower end of the ventilation duct 21 faces the outside air on the outside of the aircraft. The ventilation port 21A is enlarged toward the nose.

(Safety Device)

The safety device 30 includes a flame propagation blocking part 31 (flame arrester) which blocks propagation of the flame F generated by ignition to the inside of the fuel tank 12, and a gas supply suppressing part 32 which suppresses supply of an inflammable gas to the flame F.

The flame propagation blocking part 31 and the gas supply suppressing part 32 are incorporated in the ventilation passage 20.

(Flame Propagation Blocking Part)

The flame propagation blocking part 31 includes a blocking part main body 33 which blocks penetration of the flame F into the fuel tank 12, and a case 34 which constitutes part of the ventilation passage 20 and surrounds the outer periphery of the blocking part main body 33.

The blocking part main body 33 has a clearance formed in it which is given an upper limit specific to the inflammable gas forming the flame F, and the blocking part main body 33 absorbs the heat of the flame F trying to pass through the clearance. In this way the energy of the flame F is reduced, so that propagation of the flame F beyond the blocking part main body 33 is blocked.

Depending on the expected temperature and pressure of the inflammable gas, appropriate clearance dimension and heat capacity are set for the blocking part main body 33.

The blocking part main body 33 allows entry and exit of gas through the clearance.

As the blocking part main body 33, various types known as quenching elements which block instantaneous penetration (backfire) of the flame F, for example, a crimp ribbon type, a mesh type of layered wire meshes, a parallel plate type, and a perforated plate type, and the like, can be used. All these types are formed from a fire-resistant metal. It is also possible to form the blocking part main body 33 by sintering metal powder.

The crimp ribbon type is layers of finely crimped (pleated) metal ribbons and flat ribbons concentrically arranged with numerous triangular clearances densely packed in lateral cross-section. The crimp ribbon type causes less pressure loss of gas and is highly effective in blocking penetration of the flame F. Moreover, it has sufficient strength to withstand the impact of flame pressure.

The case 34 has a cylinder part 35 covering the outer periphery of the blocking part main body 33, and a flange 36 lying at the lower end of the cylinder part 35. The cylinder part 35 and the flange 36 are integrally formed from a fire-resistant metal.

The upper end of the cylinder part 35 is connected with the main body of the ventilation passage 20 through the internal space of the surge tank 15.

(Gas Supply Suppressing Part)

In some cases the flame F is extinguished by the flame propagation blocking part 31 absorbing its heat, and in other cases the flame F remains on the lower side (outside air side) of the flame propagation blocking part 31 when conditions for flame retention are met.

Since the gas supply suppressing part 32 is positioned closer to the outside air than the flame propagation blocking part 31 is, it is exposed to the heat of the retained flame F. The gas supply suppressing part 32 suppresses supply of the inflammable gas to the flame F.

The gas supply suppressing part 32 includes a support 37 which constitutes part of the ventilation passage 20, and a thermal expansion part 38 which is provided on the inner periphery of the support 37 and expands with the heat of the flame.

The support 37 includes a support cylinder part 371, an upper flange 372 lying at the upper end of the support cylinder part 371, a lower flange 373 lying at the lower end of the support cylinder part 371, and a rib 374 coupling the upper flange 372 and the lower flange 373 with each other.

The upper flange 372 is butted against and fixed on the flange 36 of the flame propagation blocking part 31.

The lower flange 373 is fixed on the rear side of the lid member 161.

The upper end of the ventilation duct 21 is inserted into the inside of the support cylinder part 371.

The support cylinder part 371 has an upper end part 371A which has a diameter equal to the diameter of the case 34 of the flame propagation blocking part 31, and a lower end part 371B which has a diameter equal to the diameter of the ventilation duct 21.

The diameter of the case 34 is set to be larger than the diameter of the ventilation duct 21, and the support cylinder part 371 increases in diameter toward the upper side.

The inner periphery of the support cylinder part 371 is formed so as to be symmetric relative to the axis of the support cylinder part 371.

The thermal expansion part 38 is provided on the inner periphery of the support cylinder part 371, and expands with the heat generated from the retained flame F to thereby close the inside of the support cylinder part 371.

Figure 3A:
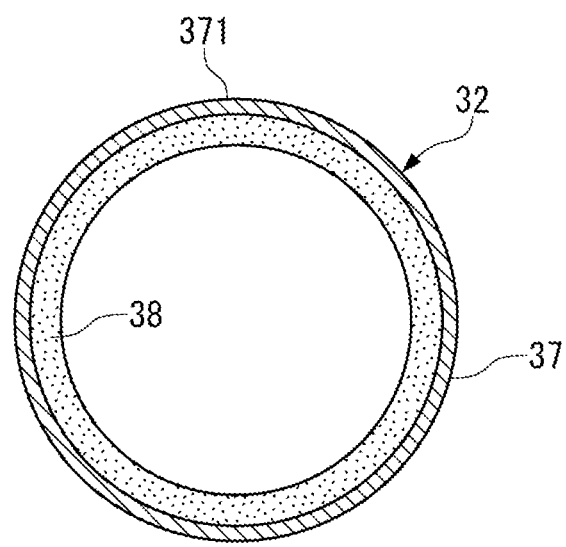
FIG. 3A is a lateral cross-sectional view along the line IIIa-IIIa of FIG. 2.
Figure 3B:
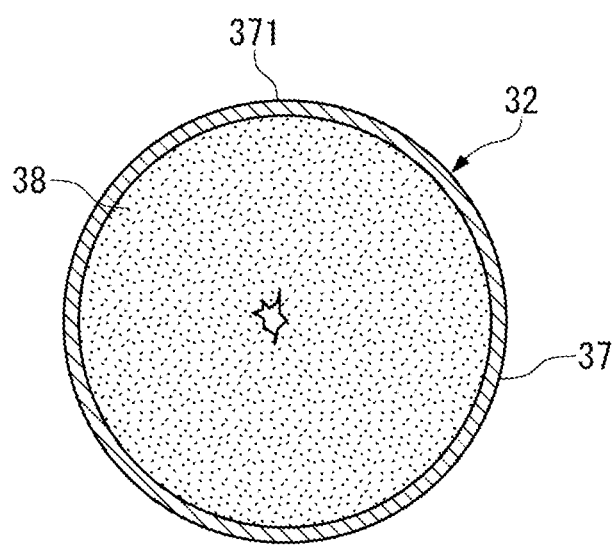
FIG. 3B is a lateral cross-sectional view along the line IIIa-IIIa of FIG. 2.

As shown in FIG. 3A, the thermal expansion part 38 is provided along the entire circumference of the support cylinder part 371. When heated by the flame F, the thermal expansion part 38 expands mainly in the radial direction and closes the inside of the support cylinder part 371 as shown in FIG. 3B. The inside of the support cylinder part 371 may be closed completely, or as shown in FIG. 3B, may be closed with a small clearance left unclosed.

When the inside of the support cylinder part 371 is closed completely, the flow of the inflammable gas inside the ventilation passage 20 is cut off. Even when the inside of the support cylinder part 371 is closed with part of it left unclosed, the flow of the inflammable gas inside the ventilation passage 20 is disrupted. In either case, the supply of the inflammable gas to the flame F through the ventilation passage 20 is suppressed.

The thermal expansion part 38 can be formed, for example, from a material which expands in volume about three to 50 times when heated to a temperature of 100 to 300° C. The thermal expansion part 38 has such fire resistance that it is not burnt down even when exposed to the flame F continuously for a predetermined time.

Examples of products formed from such a material include: "Thermal expansion-type heat-resistant seal IP" (fire-resistant putty) of Inaba Denki Sangyo Co., Ltd.; the thermal expansion seal material "Intumex" of Kyosei, Ltd.; the thermal expansion material of Togawa Rubber Co., Ltd.; and the thermal expansion fire-resistant material "Fi-Block®" of Sekisui Chemical Co., Ltd.

Of the above products, those offered in the form of a tape or a sheet can be attached along the inner periphery of the support cylinder part 371. It would be convenient if one surface of such tape or sheet is adhesive.

It is also possible to retain a tape or a sheet using a clip or the like on the inner periphery of the support cylinder part 371.

The thermal expansion part 38 can otherwise be formed from an inorganic material or organic material with an expanding agent added to it, a composite material of a base material and a thermal expansion material combined, and the like.

The thickness of the thermal expansion part 38 before expansion can be set on the basis of the diameter of the support cylinder part 371 and the expansion coefficient corresponding to the expected temperature of the flame F.

For example, in order to close an area of the support cylinder part 371 having an inner diameter of 40 mm, the thermal expansion part 38, which expands 20 times at the expected temperature, should be provided in a thickness of 1 mm. It is also possible to attach layers of tapes or sheets to a required thickness.

The thermal expansion part 38 can also be formed by applying a thermally expandable fluid to the inner periphery of the support cylinder part 371.

Advantages of this Embodiment

According to the safety device 30 of the embodiment having been described above, when an inflammable gas is ignited with an ignition source generated in the airframe or around the airframe, a backfire, which may instantaneously occur through the ventilation passage 20, can be blocked by the flame propagation blocking part 31.

According to this flame propagation blocking part 31, it is possible to prevent explosion of the fuel tank 12 caused by a rapid increase in the internal pressure of the fuel tank 12 due to combustion of the stored fuel upon penetration of a backfired flame.

Suppose that the flame F is then not extinguished and retained on the lower side of the flame propagation blocking part 31. In that case, propagation of the flame into the fuel tank 12 is continuously blocked by the flame propagation blocking part 31.

In addition, heated by being exposed to the heat of the flame F, the thermal expansion part 38 of the gas supply suppressing part 32 expands, for example, several tens of times its original volume, thereby closing the inside of the support cylinder part 371 (FIG. 3B). In this way, supply of the inflammable gas to the flame F is prevented, so that the energy of the flame F is reduced and the force of the fire diminishes.

The expanded thermal expansion part 38 acts as a resistance against the flame F and reduces the pressure of the flame F, which also contributes to blocking propagation of the flame F.

Once the supply of the inflammable gas to the flame F is lost completely as the inside of the support cylinder part 371 is closed completely, the flame is extinguished in no time.

Here, suppose that the flame is continuously retained as the inflammable gas, though in a small amount, is supplied continuously or intermittently. In that case, while the ventilation duct 21, the safety device 30, and the surge tank 15 are heated by the heat of the flame F, since the energy of the flame F has been reduced, propagation of the heat beyond the surge tank 15 to the outer tank 14 and the inner tank 13 and to the ventilation passage 20 inside the tanks 14, 13 is suppressed.

Therefore, it is possible to avoid the fuel inside the outer tank 14 and the inner tank 13 being heated to the ignition point.

Thus, according to the gas supply suppressing part 32, it is possible to prevent explosion of the fuel tank 12 due to fuel ignition.

As described above, according to the safety device 30 of this embodiment, even if an inflammable gas is ignited, it is possible to reliably explosion-proof the fuel tank 12 by blocking propagation of the flame F and suppressing supply of the inflammable gas to the flame F.

Second Embodiment

Next, a second embodiment of the present invention will be described with reference to FIGS. 4A and 4B.

The second embodiment differs from the first embodiment in the configuration of the gas supply suppressing part of the safety device, and is the same as the first embodiment in other configurations.

The same configurations as those having been already described are denoted by the same reference signs. The same applies to the subsequent embodiments.

A safety device 40 shown in FIG. 4A includes the flame propagation blocking part 31, and a gas supply suppressing part 42 which is positioned closer to the ventilation port 21A than the flame propagation blocking part 31 is.

The gas supply suppressing part 42 includes a cylinder 47 which is part of the ventilation passage 20, a lid 43 (closing member) which can close the inside of the cylinder 47, and a suspension tool 44 (retaining member) which suspends the lid 43.

The cylinder 47 is configured in the same manner as the support 37 of the first embodiment. The diameter of the upper end part 371A is larger than the diameter of the lower end part 371B, and the cylinder 47 increases in diameter gradually toward the upper side.

The lid 43 is a circular plate having a diameter slightly larger than the inner diameter at the upper end of the ventilation duct 21 which is inserted into the lower end part 371B, and the lid 43 is suspended by the retaining member 44 on the inside on the upper end side of the cylinder 47. The lid 43 is formed from a fire-resistant metal.

The suspension tool 44 is mounted on and hangs down from a frame 331 which supports the lower surface of the blocking part main body 33 of the flame propagation blocking part 31, and suspends the lid 43 at a position away from the lower surface of the blocking part main body 33. Since the diameter of the lid 43 is smaller than the inner diameter of the cylinder 47 at the upper end side, there is a clearance between the outer periphery of the lid 43 and the inner periphery of the cylinder 47. That is, the inside of the cylinder 47 is not closed but the ventilation passage 20 is open, so that entry and exit of gas is allowed through the ventilation passage 20.

Since the lid 43 is at a distance from the lower surface of the flame propagation blocking part 31, there is no interference with entry and exit of gas through the lower surface of the flame propagation blocking part 31.

In this embodiment, the suspension tool 44 is mounted at the center of the lid 43. However, the position at which the suspension tool 44 is to be mounted is not limited to this position. In addition, it is also possible to mount the suspension tool 44 at a plurality of positions of the lid 43 and retain the lid 43 by means of the plurality of suspension tools 44.

The suspension tool 44 is formed from a material which is fused or burnt down when heated by the heat of the flame F.

Thus, when heated by the heat of the flame F, the suspension tool 44 releases the lid 43 from retention.

The suspension tool 44 can be formed, for example, from a resin having a heatproof temperature of lower than 100° C.

In this embodiment, when the flame F is generated by ignition of an inflammable gas present near the ventilation port 21A, instantaneous propagation of the flame F is first blocked by the flame propagation blocking part 31 as in the first embodiment.

Subsequently, when the suspension tool 44 is fused and burnt down by the flame F, the lid 43 is released from the retention of the suspension tool 44, so that the lid 43 falls under its own weight as shown in FIG. B and is supported at the upper end of the ventilation duct 21. As the ventilation passage 20 is closed by this lid 43, the gas flow inside the ventilation passage 20 is cut off. Accordingly, supply of the inflammable gas to the flame F stops, so that the flame F is reduced in energy and eventually extinguished. The lid 43 acts as a resistance against the flame F and reduces the pressure of the flame F, which also contributes to blocking penetration of the flame F.

Thus, even if an inflammable gas is ignited, it is possible to reliably explosion-proof the fuel tank 12 by blocking propagation of the flame F and blocking supply of the inflammable gas.

In the second embodiment, the lid 43 which has fallen is supported at the upper end of the ventilation duct 21. However, the position where the lid 43 remains is not limited to this, but is determined by the relation between the diameter of the lid 43 and the inner diameter of the ventilation passage 20. For example, if the lid 43 is a little larger, the lid 43 is supported on the inner wall of the cylinder 47 onto which the lid 43 falls. If the ventilation duct 21, like the cylinder 47, increases in diameter toward the upper side, the lid 43 can be configured so as to be supported on the inner wall of the ventilation duct 21.

Third Embodiment

Next, a third embodiment of the present invention will be described with reference to FIG. 5.

The third embodiment is the same as the second embodiment in that the ventilation passage 20 is closed by causing the lid 43 to fall under its own weight, but in the third embodiment, instead of the lid 43 being suspended and caused to fall in the vertical direction, the lid 43 retained along the inner wall of the cylinder 47 is caused to slide down toward the upper end of the ventilation duct 21.

The following description will be focused on differences from the second embodiment.

Figure 5A:
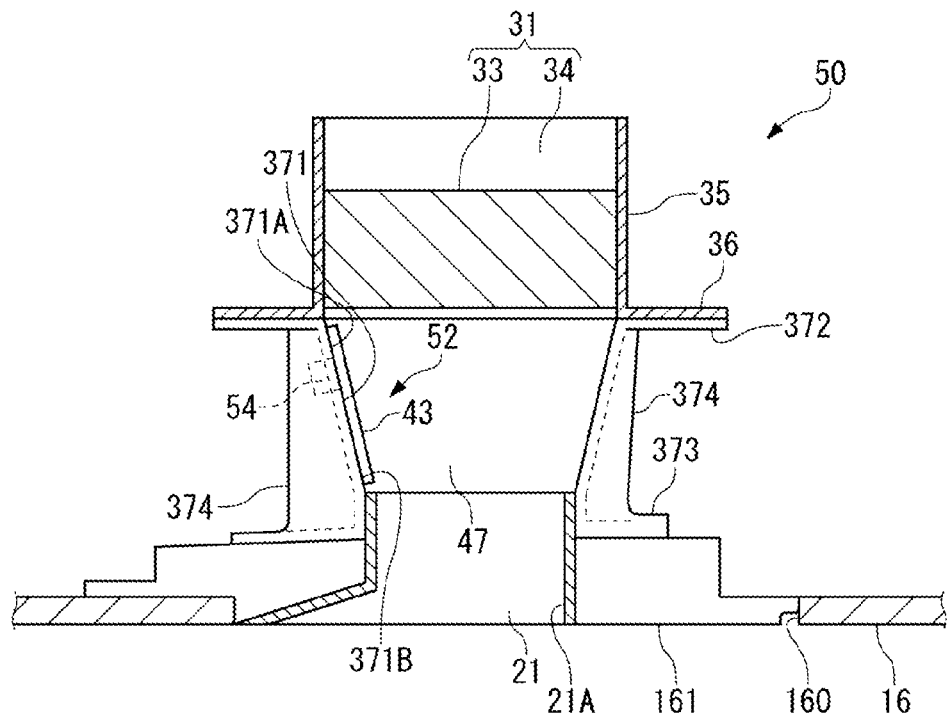
FIG. 5A is a longitudinal cross-sectional view showing a safety device according to a third embodiment in a state where the ventilation passage is open.

A safety device 50 shown in FIG. 5A includes the flame propagation blocking part 31, and a gas supply suppressing part 52 which is positioned closer to the ventilation port 21A than the flame propagation blocking part 31 is.

The gas supply suppressing part 52 includes the cylinder 47, the lid 43, and a magnet 54 (retaining member) provided on the inner wall of the cylinder 47.

The lid 43 of this embodiment is formed from a ferromagnetic material, for example, an iron alloy, and is retained almost along the inner wall of the cylinder 47 by being attracted by the magnet 54. At this point, the ventilation passage 20 is opened.

Figure 5B:
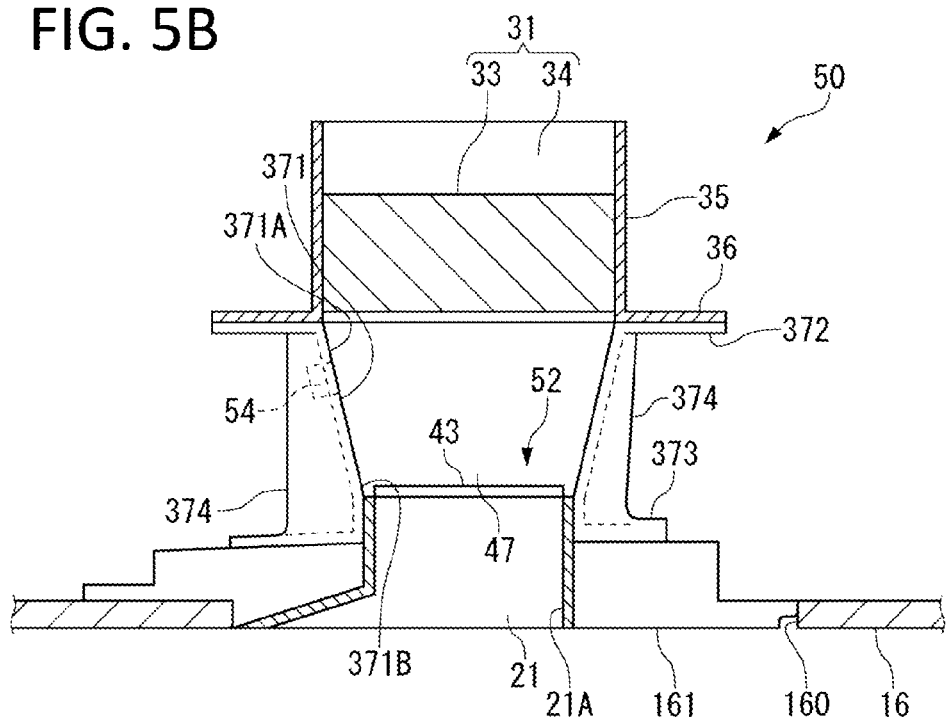
FIG. 5B is a longitudinal cross-sectional view showing the safety device according to the third embodiment in a state where the ventilation passage is closed.

In this embodiment, when the magnetic force of the magnet 54 decreases as the magnet 54 is heated by the heat of the flame F, the lid 43 is released from the retention of the magnet 54, so that the lid 43 falls and is supported at the upper end of the ventilation duct 21 as shown in FIG. 5B. Since the ventilation passage 20 is closed by this lid 43, the gas flow inside the ventilation passage 20 is cut off.

According to this embodiment, in addition to the same advantages and effects as those of the second embodiment, there is an advantage in terms of ventilation since the resistance provided by the lid 43 in the gas flow at normal times can be made smaller than in the second embodiment.

Fourth Embodiment

Next, a fourth embodiment of the present invention will be described with reference to FIG. 6.

In the third embodiment, the lid 43 moves under its own weight, but in the fourth embodiment the lid 43 is moved by a spring force.

Figure 6A:
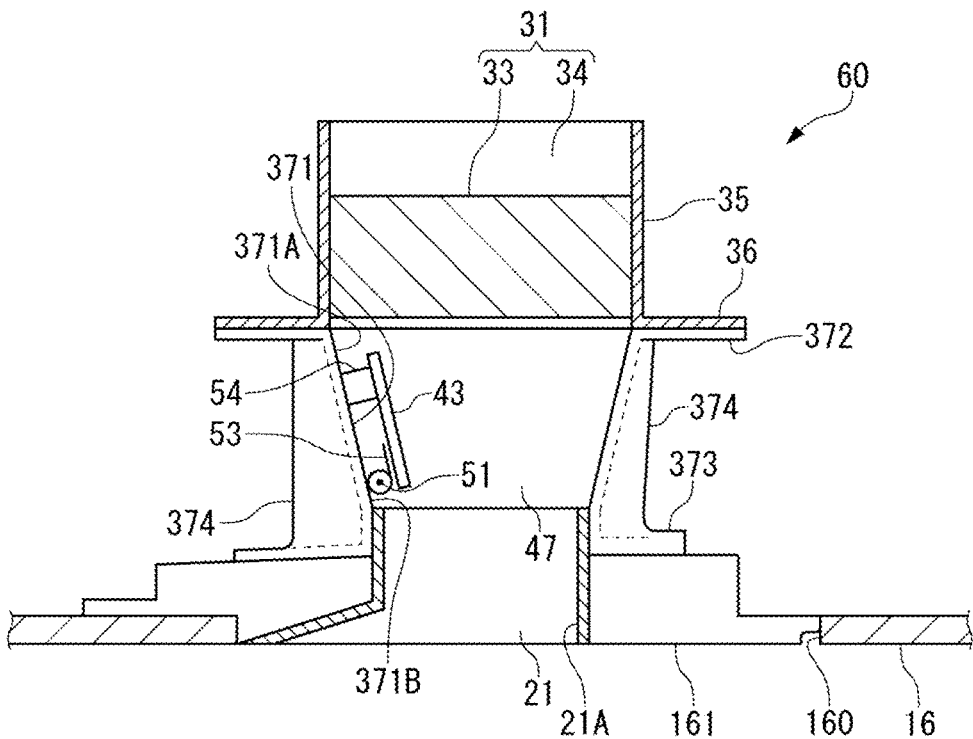
FIG. 6A is a longitudinal cross-sectional view showing a safety device according to a fourth embodiment in a state where the ventilation passage is open.

In this embodiment, as shown in FIG. 6A, the lid 43 is provided so as to be rotatable around a hinge 51 which is mounted horizontally in the lower end part 371B of the cylinder 47. A spring 53 is provided between the lid 43 and the inner wall of the cylinder 47. When the lid 43 is retained by the magnet 54, the spring 53 is compressed by the lid 43.

Figure 6B:
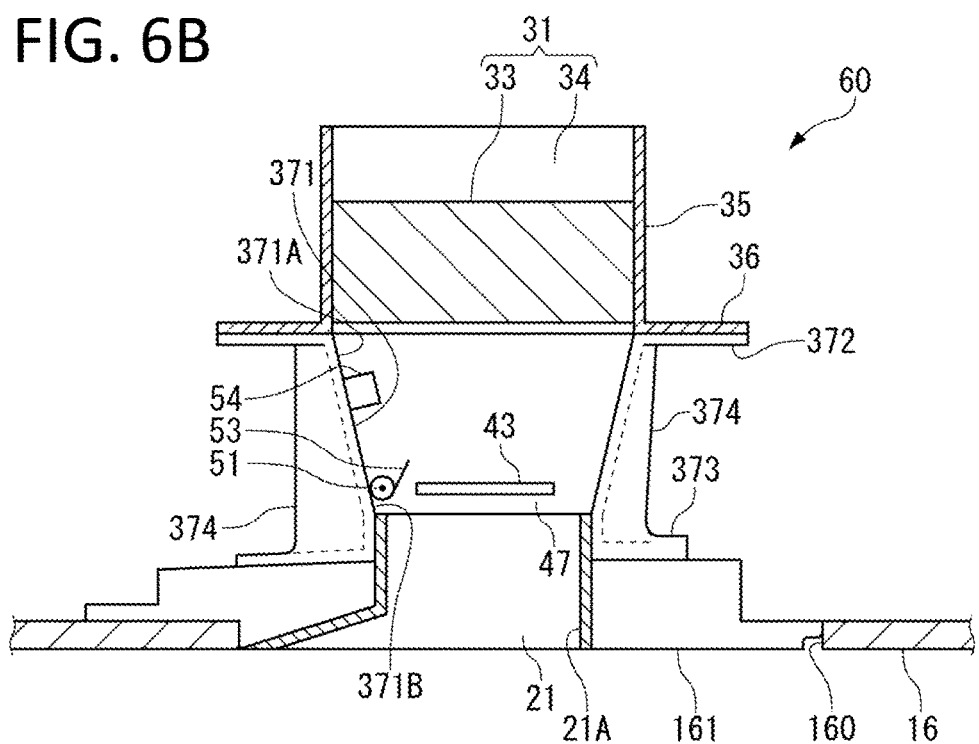
FIG. 6B is a longitudinal cross-sectional view showing the safety device according to the fourth embodiment in a state where the ventilation passage is closed.

When the magnet 54 is heated by the heat of the flame F and decreases in magnetic force and the lid 43 is released from the retention of the magnet 54, the lid 43 is rotated by the elastic force of the spring 53 as shown in FIG. 6B. The lid 43 closes the inside of the ventilation passage 20.

According to this embodiment, the same advantages and effects as those of the third embodiment can be obtained, and moreover, the lid 43 can be more reliably activated by rotating the lid 43 around the hinge 51 through the elastic force of the spring 53.

Other than the examples shown above, a shutter 60 and a retaining member 66 which retains the shutter 60 in the open state schematically shown in FIG. 7 can be used as the gas supply suppressing part of the safety device of the present invention.

The shutter 60 has two circular plates 61, 62 each having a plurality of slits 65 formed in it. The plate 61 is shown in white and the plate 62 is shown in gray (see FIG. 7B).

Figure 7A:
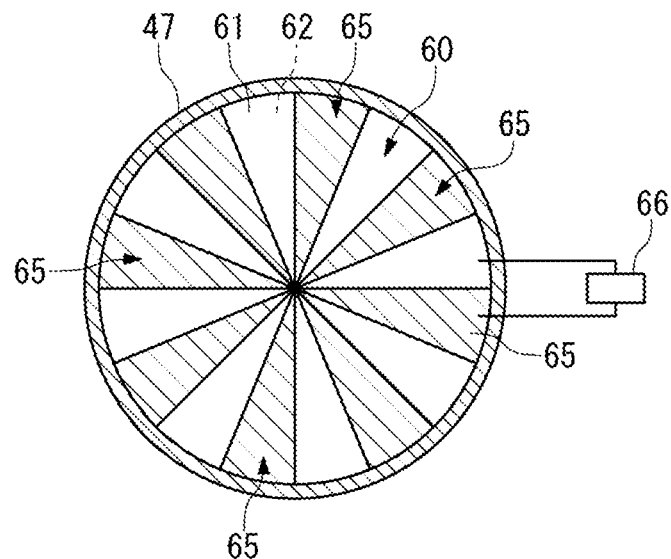
FIG. 7A is a plan view showing a safety device according to a modified example of the present invention.

These plates 61, 62 are pivotally supported at the center, and when the slits 65 of the plate 61 and the slits 65 of the plate 62 are aligned, the shutter 60 is opened as shown in FIG. 7A. The plate 62 is positioned on the rear side of the plate 61. In FIG. 7A, the regions (openings) of the slits 65 are shaded. Gas enters and exits through the slits 65.

Figure 7B:
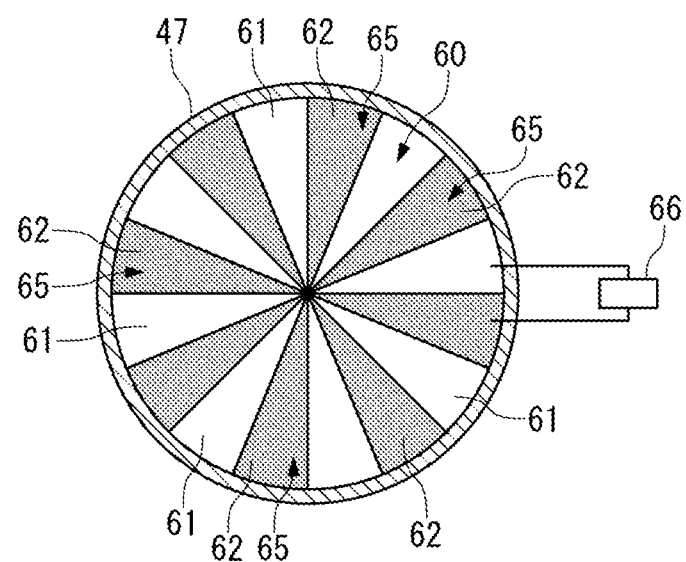
FIG. 7B is a plan view showing the safety device according to the modified example of the present invention.

When the plate 62 is rotated clockwise by the angle of one slit 65 from the state shown in FIG. 7A, the plate 62 is disposed behind the slits 65 of the plate 61 as shown in FIG. 7B, so that the shutter 60 is closed.

At normal times, the retaining member 66 retains the shutter 60 in the open state (FIG. 7A), and when heated by the flame F, switches the shutter 60 to the closed state (FIG. 7B). For example, a bimetal switch, which functions on the basis of the difference in thermal expansion coefficient of two types of metals, can be used as the retaining member 66.

In addition, it is possible to make a selection of the configurations exemplified in the above-described embodiments, or appropriately change one configuration to another within the scope of the present invention.

The safety device of the present invention can also be provided near a ventilation port which faces in the horizontal direction or the vertical direction. In that case, the ventilation passage can be closed by moving the lid using a spring force, for example.

The pipe, duct, and the like of the ventilation passage in the present invention can be arbitrarily configured. In the above-described embodiments, in view of the ease of manufacture and assembly, the case 34 of the flame propagation blocking part 31, the cylinder (including the support 37) of the gas supply suppressing part 32, and the ventilation duct 21 are configured as separate parts. However, these parts can also be integrally configured.

Moreover, the inner periphery of the support 37 may be formed so as to be asymmetric relative to the axis of the support 37.

The safety device of the present invention can be disposed in the ventilation passage 20 at an arbitrary position.

It is also preferable to provide the safety device of the present invention near the ventilation port 21A and at least at one intermediate position of the ventilation passage 20.

In the safety device of the present invention, the positional relation between the flame propagation blocking part and the gas supply suppressing part is not limited to that of the above-described embodiments, but the flame propagation blocking part may lie closer to the outside air than the gas supply suppressing part is.

The safety device of the present invention can be used in combination with an explosion-proof system which supplies a nitrogen-enriched gas into a fuel tank or an explosion-proof structure which adopts a lightning-protection fastener.

The safety device of the present invention can be used not only for explosion-proofing a fuel tank of an aircraft but also for explosion-proofing a fuel tank of various plants and facilities.

What is claimed is:

1. An aircraft safety device for explosion-proofing a fuel tank which stores fuel of an aircraft, the fuel tank comprising a ventilation passage that permits ventilation between an inside of the fuel tank and an outside of the fuel tank, the aircraft safety device comprising:

a flame propagation blocking part which blocks propagation of a flame from the outside of the fuel tank to the inside of the fuel tank through the ventilation passage; and a gas supply suppressing part which, suppresses a supply of an inflammable gas containing gas of the fuel to the flame through the ventilation passage when the gas supply suppressing part is heated by the flame, wherein the gas supply suppressing part comprises:
- a support which constitutes part of the ventilation passage; and
- a thermal expansion part which is provided on the inner periphery of the support and is configured to expand when heated by the flame.

2. The aircraft safety device according to claim 1, wherein the gas supply suppressing part is positioned closer to the outside of the fuel tank than the flame propagation blocking part.

3. The aircraft safety device according to claim 1, wherein the aircraft safety device is provided in the ventilation passage.

4. The aircraft safety device according to claim 1, wherein the flame propagation blocking part is incorporated in the ventilation passage.

5. An aircraft safety device for explosion-proofing a fuel tank which stores fuel of an aircraft, comprising:
- a flame propagation blocking part which blocks propagation of a flame from the outside to the inside of the fuel tank through a ventilation passage which allows ventilation between the inside and the outside of the fuel tank; and
- a gas supply suppressing part which, when heated by the heat of the flame, suppresses supply of an inflammable gas containing gas of the fuel to the flame through the ventilation passage, wherein the gas supply suppressing part comprises:
- a support which constitutes part of the ventilation passage, and a thermal expansion part which is provided on the inner periphery of the support and expands when heated by the flame.

\* \* \* \* \*